United States Patent [19]

Shinohara et al.

[11] 4,002,150
[45] Jan. 11, 1977

[54] GAS GENERATOR FOR MOUNTING ON AN AUTOMOBILE

[75] Inventors: Hiroshi Shinohara, Okazaki; Kunihiko Masunaga; Masakatsu Kani, both of Toyota; Hidetomo Umehara, Susono, all of Japan

[73] Assignee: Toyota Jidosha Kogyo Kabushiki Kaisha, Toyota, Japan

[22] Filed: Mar. 10, 1975

[21] Appl. No.: 557,119

[30] Foreign Application Priority Data

Aug. 12, 1974 Japan .............................. 49-092199

[52] U.S. Cl. .................................... 123/3; 123/1 A
[51] Int. Cl.² ........................................ F02B 43/00
[58] Field of Search ............ 123/DIG. 12, 3, 119 E, 123/122 G, 1 A

[56] References Cited

UNITED STATES PATENTS

| | | | |
|---|---|---|---|
| 1,627,938 | 5/1927 | Tingley | 123/119 E |
| 2,057,808 | 10/1936 | Widegren | 123/122 G X |
| 2,080,420 | 5/1937 | Havekost et al. | 123/3 X |
| 3,682,142 | 8/1972 | Newkirk | 123/3 |
| 3,717,129 | 2/1973 | Fox | 123/1 A |
| 3,785,781 | 1/1974 | Hervert et al. | 123/3 |
| 3,828,736 | 8/1974 | Koch | 123/3 |

*Primary Examiner*—Charles J. Myhre
*Assistant Examiner*—William C. Anderson
*Attorney, Agent, or Firm*—Brisebois & Kruger

[57] ABSTRACT

Gas generator for mounting on an automobile, said generator comprising a float chamber for holding a liquid fuel, a gas tank to hold an inflammable gas generated through partial oxidation and steam-reforming of said liquid fuel after passage through catalyst beds, and a valve for opening and closing a duct which carries said liquid fuel from said float chamber to the carburetor in response to the pressure within said gas tank, characterized in that when starting, only the liquid fuel is supplied from said float chamber to the carburetor to drive the engine, and when said catalyst beds are heated up and the inflammable gas fills the gas tank, said inflammable gas is used as the fuel supply for the engine.

11 Claims, 3 Drawing Figures

GAS GENERATOR FOR MOUNTING ON AN AUTOMOBILE

BACKGROUND OF THE INVENTION

The atmospheric pollutants emitted from gasoline engines and other sources are posing a social problem and considerable research and development have been undertaken to reduce the pollutant emissions. Liquid fuel is gasified by municipal gas companies or the petrochemical industry. Unlike chemical plants where the supplies of air and power are ample, these supplies for cars are restricted in terms of available power, heat and electric energy in one way or another.

In spite of these various restrictions, the present inventors have successfully completed a gas generator suitable for supplying a gaseous fuel to an automobile.

SUMMARY OF THE INVENTION

The principal object of the present invention is to generate a fuel gas for driving an engine by heating catalyst beds with the engine exhaust, and using such liquid fuels as hydrocarbons and methanol as the basic fuel, whereby on one hand these fuels are steam-reformed by adding steam and using a catalyst, and on the other hand these fuels are mixed with air, while a partial oxidation reaction takes place under the effect of the catalyst. The heat lost in said steam-reforming reaction can be compensated for by the heat generated by the partial oxidation reaction and the heat of the exhaust from the engine.

Another object of the present invention lies in effectively utilizing the heat of the exhaust gas conventionally discharged from an engine exhaust pipe to improve energy economy.

Still another object of the present invention lies in decreasing the energy consumption and increasing the engine efficiency through an increase in the available engine fuel resulting from the steam-reforming reaction between steam and fuel in the presence of a nickel catalyst, said steam being obtained from the exhaust gas.

Still another object of the present invention is to realize a substantial decrease in the cost of the fuel regardless of the octane value of the fuel, without requiring any gasoline processing plant for contact-reforming of the type employed in an oil-refining plant and without requiring various conventional additives for doping the gasoline.

Still another object of the present invention is to permit steady driving of the car by swiftly heating up the engine from cold state in which insufficient power is supplied and provide for the easy control of the engine temperature through the use of both endothermic and exothermic reactions.

The other objects of the present invention will become apparent from the following description of a preferred embodiment of the present invention.

DESCRIPTION OF THE INVENTION

Figure 1:
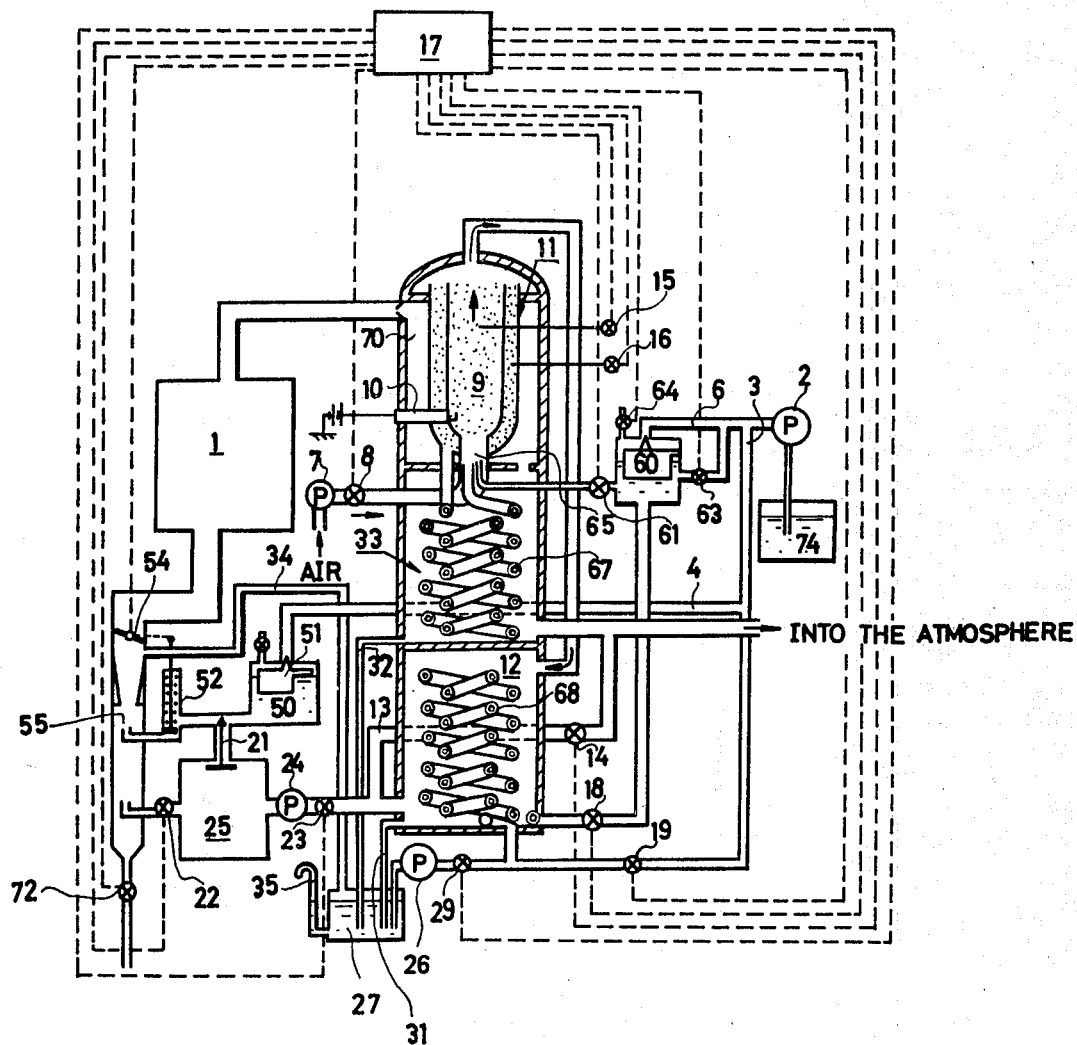
FIG. 1 is a diagram illustrating the layout of the complete apparatus for carrying out the present invention.

A preferred embodiment of the present invention will now be described with reference to the accompanying drawings.

A gas generator for mounting on a motor vehicle according to the present invention comprises a preheater 12 in which a liquid fuel such as a mixture of hydrocarbons and the water for carrying out the steam-reforming reaction are preheated by the gas generated by the partial oxidation reaction and steam-reforming reaction. In the heater 33 the liquid fuel and water preheated in said preheater are further heated by the exhaust gas which has heated the catalyst beds 9, 11. The float chamber 50 holds a nonreformed liquid fuel, while the gas tank 25 holds the inflammable gas generated by the partial oxidation and steam-reforming of the liquid fuel which is passed through the catalyst beds 9, 11. A valve 21 in the duct carrying the liquid material from the float chamber 50 to the carburetor 55 opens or closes said duct in response to the pressure within the gas tank 25. The exhaust gas is introduced into the reaction chamber 70 to heat the catalyst beds with the controller 17 acting upon demand of the internal combustion engine to open or close the valves 8, 12, 14, 19, 21, 22, 23, 29, 61, 63, 64 and 72 for controlling the pump for supplying the liquid fuel and the flow rates of the liquid and gas.

Referring now to FIG. 1, the operation and construction of the gas generator according to the present invention will now be described.

The starter of the engine is actuated and the engine starts. When this happens, the pump 2 driven by the engine camshaft acts to supply the liquid fuel from the fuel tank 74 to the ducts 3 and 6. The liquid fuel supplied to the duct 3 passes through the duct 4 and the float chamber 50 to the front of the carburetor to compensate for the liquid fuel consumed in the engine.

The greater part of the liquid fuel flows into the duct 6, passes through the float chamber 60 and the valve 61, and mixes with the air drawn in through the control valve 8 by a pump below the platinum catalyst bed 9. The mixture of the air and the liquid fuel enters the catalyst bed 9, where it is ignited by the spark plug 10. If some material easily permeable to the liquid fuel, such as a refractory brick, is provided below the catalyst bed, the combustion following the ignition is easily maintained.

Perfect combustion of the material within the catalyst bed 9 without misfire or backfire will be assured by providing a gap below the catalyst bed, thereby balancing the rate of flow of the mixture of liquid fuel and air with the burning rate of the liquid fuel.

As the liquid material is ignited and the catalyst bed 9 is heated, the combustion advances into the catalyst bed and takes place flamelessly within that bed. The exhaust gas generated by perfect combustion heats the platinum catalyst bed 9 and the nickel catalyst bed 11 located around the catalyst bed 9, and after being cooled as it passes through the preheater 12, is discharged into the atmosphere through the duct 13 connected to the lower part of the preheater 12 and via the control valve 14.

When the catalyst bed 9 is unheated, the thermostat 15 acts, whereby the controller 17 opens the valves 64, 61, 8 and closes the valve 63.

In the float chamber 60, the level of the liquid fuel is kept constant by means of a float. The liquid fuel flowing through the valve 61 is held within the venturi tube 65 at the same level as that of the liquid fuel within the float chamber 60. The liquid material introduced at the bottom of the float chamber 60 passes through the valve 18 into the pipe 67 which runs inside the heating coil 33 passing through the preheater 12 and exits through the top of the venturi tube 65. Within the pipe 67 the liquid fuel is held at the same level as the liquid fuel in the float chamber 60.

With the starter on and the engine started, the air begins to be supplied by the pump 7. Then the air, whose rate of flow is stepped up at the venturi tube 65, sucks in the liquid fuel through the valve 61. The liquid material and air are mixed and, as stated above, the mixture enters the catalyst bed 9 and is ignited for perfect combustion by the spark plug 10. The liquid fuel within the pipe 67 then begins to be heated by the exhaust gas.

When the catalyst bed 9 is heated up with the catalyst reaching the reacting temperature, the thermostat 15 acts, whereupon the controller 17 opens the valve 63, closes the valves 61, 64 and the liquid fuel is supplied continuously to the pipe 67 from the pump 2 through the valve 63, the float chamber 60 and the valve 18. At the same time, the valve 8 is throttled to supply the necessary volume of air for partial oxidation of the liquid fuel. With the starting of the partial oxidation reaction, the valve 14 closes and the valve 23 opens. These valves open and close accordingly as the thermostat 15 detects temperatures and the controller 17 acts. Thereupon the gas generated through said partial oxidation passes through the preheater 12, thereby heating the liquid fuel and being itself cooled. Then it passes through the pump 24, the gas tank 25 and the valve 22 to be mixed with the secondary air and becomes the fuel for the engine 1.

When the steam-reforming catalyst of the catalyst bed 11 attains the reacting temperature, the thermostat 16 acts, whereupon the controller 17 opens the valves 19, 29. With the opening of the valve 29, the electromagnetic pump 26 starts supplying the necessary water for steam-reforming from the water tank 27 to the valve 29. Said water is mixed with the liquid coming from the valve 19 and the mixture is delivered to the spiral pipe 68 within the preheater 12 and the heater 33, where the mixture is heated by the generated gas and the exhaust gas, and the steam produced there is delivered to the catalyst bed 11. The necessary heat for this reaction is supplied from the heat generated by the partial oxidation reaction and from the heat of the exhaust gas.

The temperature of the catalyst beds 9, 11 is controlled by controlling the valves 18, 19, 29, 8. The temperature of the catalyst bed 11 is detected by the thermostat 16. When the catalyst bed temperature falls below the control temperature, the valves 19, 29 are throttled and the valves 18, 8 are opened, thereby promoting partial oxidation, which is an exothermic reaction, and suppressing the steam-reforming which is an endothermic reaction. When the catalyst bed temperature rises above the control temperature, the reverse process takes place.

Let it be supposed that the liquid fuel is n-hexane. Then in the catalyst bed 9, a partial oxidation reaction takes place in the presence of the platinum catalyst, the reaction formula being as follows;

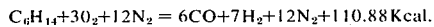

In the catalyst bed 11, steam-reforming takes place in the presence of the nickel catalyst, the reaction formula being as follows:

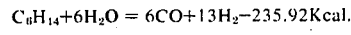

If the liquid material supply in grams per hour per gram of catalyst weight is defined as the ratio between the weight of the liquid and that of the catalyst, an appropriate value for this ratio for a gas generator mounted on an automobile will lie between 0.1 and 4, the optimum value being between 0.5 and 1.5.

Now if it be supposed that the liquid-catalyst weight ratio = 1, the molecular specific heat of the catalyst = 120.32 J/mol degree and its molecular weight = 102. (If alumina is used as the catalyst carrier, according to the Handbook of Chemistry compiled by the Japan Society of Chemistry, the molecular specific heat of $Al_2O_3$ is 120.32 J/mol at a temperature of 800° K and its molecular weight is 102.) Let it also be supposed that the catalyst bed temperature is 10° C lower than the control temperature. Then if the liquid fuel supply of n-hexane is set at 86g/hr, the catalyst weight is 86g. The minimum heat required for raising the temperature of the catalyst by 10° C and causing the catalyst bed to attain the control temperature will be:

Catalyst molecular specific heat (120.32 J/mol. deg) × 1/4.184 Cal/J catalyst weight (86g) ÷ 102 g/mol × 10 deg = 242.5 Cal.

If this heat loss is to be compensated by the suppression of the steam-reforming reaction and promotion of partial oxidation reaction, the consumption of the liquid material in the partial oxidation reaction need only be increased by 0.06 g/hr and the consumption of the fuel in the steam-reforming reaction need only be decreased by the same amount. Thus a mere 0.07% change in the flow rate of the liquid fuel causes a 10° C rise in the temperature of the whole catalyst bed.

The necessary water for the steam-reforming reaction comes from the unreacted water resulting from the cooling of the generated gas and from the cooled steam of the exhaust gas. The generated gas preheats the liquid material and water in the preheater 12 and is itself cooled. The steam contained in the generated gas then becomes water, which passes through the duct 31 and is collected in the water tank 27. Meanwhile the steam generated by combustion in the engine is also cooled while passing through the catalyst bed heater 70 and the heater 33. After passing through the duct 32, it is also collected in the water tank 27. The water tank 27 is connected to the duct 35 which opens into the atmosphere, so that the excess water is discharged into the atmosphere when the water level in the water tank 27 exceeds a certain height.

A fine tube 34 extends from the water tank 27 to the back of the carburetor. A small amount of gas carried together with the water collected in the water tank 27 accumulates at the top of the tank 27 and is drawn by the negative pressure of the engine suction into the engine 1 via the duct 34. The pressure in the preheater 12 and the heater 33 is slightly higher than the atmospheric pressure and by providing an adequate orifice plate in the ducts 32, 31, 34, the water volume in the tank can be controlled.

Since the liquid material and water are preheated and heated before the reaction, the response of the engine to a sudden load change is somewhat sluggish. Therefore, when the engine needs more fuel, the valve 21 is opened to introduce the liquid fuel and mix it with the generated gas for combustion. If on the contrary, the engine suddenly ceases to need the fuel, the valve 22 has only to be closed.

Figure 2:
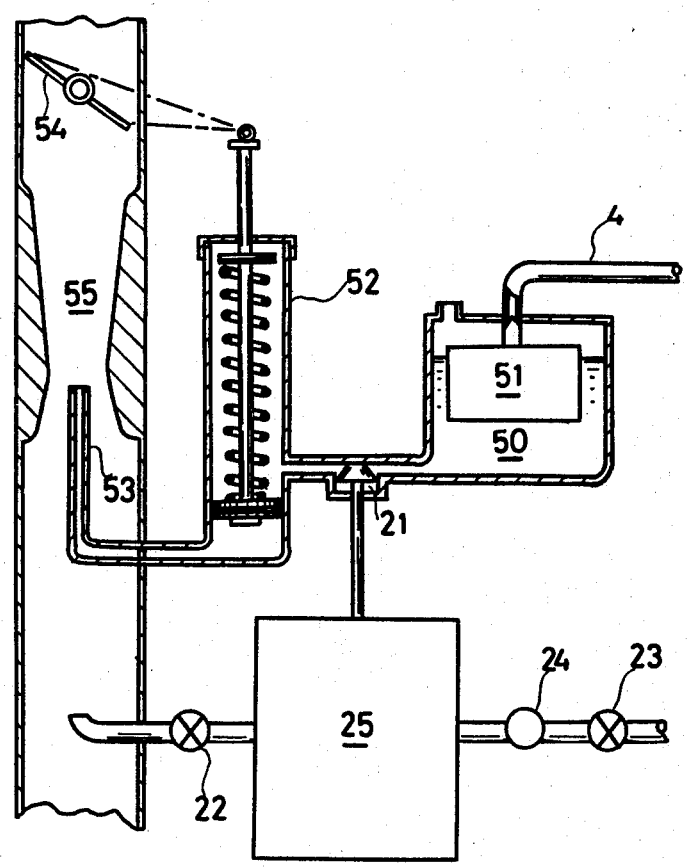
FIG. 2 is an enlarged sectional view of the unit for mixing the generated gas, air and liquid.
Figure 3:
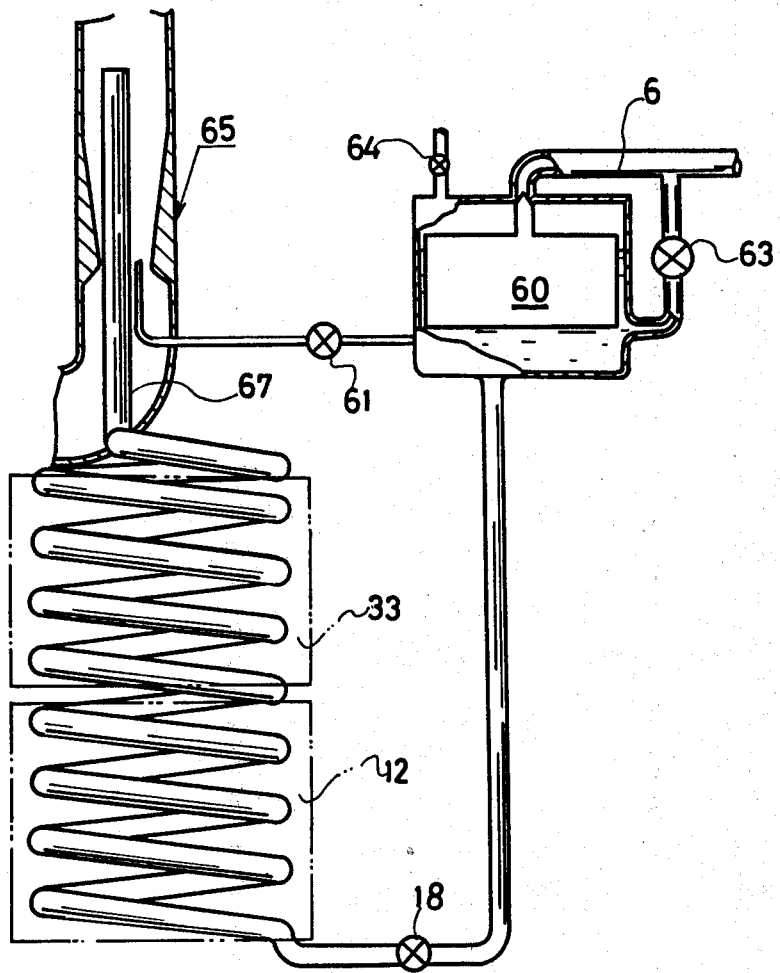
FIG. 3 is an enlarged view of the unit for handling air and liquid.

Fuel control under sudden acceleration takes place as follows. Referring to FIG. 2, part of the liquid fuel is stored in the float chamber 50 with the float 51 keeping the liquid level in the float chamber 50 constant. The liquid fuel in the float chamber is delivered to the venturi tube 55 upon opening of the diaphragm valve 21 in response to the pressure of the gas tank 25 and opening of the valve 52 for controlling the flow rate.

At the moment at which the engine starts, gas is not yet being generated, and the pressure in the gas tank 25 is close to atmospheric pressure. Thus the valve 21 is open and at the moment of starting the liquid fuel from the float chamber 50 passes through the valve 21 and the valve 52 controlled by the accelerator, spurts out of the nozzle 53 and is mixed with the air which enters the venturi tube 55 through the valve 72. When the gas is generated, the pressure in the gas tank 25 also rises and the valves 21 and 52 are closed.

In a steady state, the engine revolution may be controlled over a wide range by regulating the volumes of air and gas admitted. When sudden acceleration becomes necessary, as the accelerator is worked hard, the volumes of air and gas supplied are increased; consequently the pressure in the gas tank 25 drops and the valve 21 is opened to introduce the mixture of liquid fuel, gas and air into the engine.

With acceleration, the supply of liquid fuel, water and air into the gas generator is increased and as the result the volume of gas generated increases. An increase in the gas generation results in an increase in the pressure in the gas tank 25 and in closing of the valve 21. Thus the engine begins to operate on the gas fuel alone. By this process an engine control with good response can be obtained.

When the engine stops, all the pumps come to a halt and there is no more generation of gas, with the temperature falling in the catalyst bed and all the control valves reverting to the position before starting.

In the internal combustion engine, where a definite volume of gas undergoes adiabatic compression and expansion, etc., the internal gas undergoes a complicated change in enthalpy. At high temperatures thermal decomposition of the burning gas occurs and various methods have to be used to identify the chemical products generated by thermal decomposition. If the gasoline is represented by n-hexane and it is completely burned, the maximum theoretical temperature of the burning gas will be 2316° K.

Using the apparatus according to the present invention, in a steady state, the catalyst bed can be heated to 450° – 550° C by the exhaust gas from the engine. In other words, the catalyst bed temperature can be held at 450° – 550° C if the heat generated through partial oxidation on the catalyst is equal to the heat lost in the steam-reforming reaction.

To satisfy these conditions, the ratio of the necessary liquid fuel for partial oxidation to the necessary liquid fuel for steam-reforming should be 2 : 1. The chemical formula for gas generation at this ratio is:

$$C_6H_{14}+2(O_2+4N_2)+2H_2O = 6CO+9H_2+8N_2.$$

When the gas thus generated is burned in the engine:

$$6CO+9H_2+8N_2+(15/2)(O_2+4N_2) = 6CO_2+9H_2O+38N_2+926.4 \text{ Kcal},$$

the maximum theoretical temperature of the burning gas being 2244.7° K.

If the gasoline is represented by n-hexane, there will be a 2 mols difference in steam in the exhaust gas between the case in which n-hexane is burned directly in the internal combustion engine and the case in which the gas generated through the partial oxidation and steam-reforming of n-hexane is burned. If the exhaust temperature is 800° C in both cases, the theoretical thermal efficiency when the n-hexane is directly burned will be 0.703 and that in which n-hexane is partially oxidized and steam-reformed will be 0.692. Thus there is hardly any difference between them in the theoretical means effective pressure.

In the apparatus according to the present invention in which the liquid material and water are preheated and heated by the exhaust gas and the generated gas, the steam-reforming reaction can, in practice, take place at a ratio greater than the above and the inflammable gas can be increased with a resulting economy in fuel.

In a gasoline engine operating on the Otto cycle, the thermal efficiency is increased by stepping up the compression ratio, but an increased compression ratio causes various abnormal combustions in the engine, leading to the so-called "knocking" phenomenon. The octane value is taken as a measure of the knocking, but there are no measured data on the octane values for hydrogen, methane and carbon monoxide. According to one publication on the ignition temperature and pressure of hydrocarbons (G. S. Scott et al., Annual Chemistry 20, P238 (1948) and D. Downs et al., Proc. of the 4th World Petroleum Congress Sec. VI/F-5(1955)), hydrogen, methane and carbon monoxide ignite at rather high temperatures without having any cold flame range and they are estimated to have excellent anti-knocking characteristics.

In an experiment carried out by the present inventors a car was operated by using a synthetic gas of hydrogen, carbon monoxide, etc., as the fuel in much the same way as with gasoline, and the contents of carbon monoxide and nitrogen oxide in the exhaust gas were considerably lower than in the case of gasoline. At the same time, the burning range of hydrogen and carbon monoxide was considerably wider than that of gasoline. Besides, with no emission of harmful elements, the operation could be smoothly controlled.

What is claimed is:
1. A gas generator comprising:
 a. a chamber for holding a liquid fuel,
 b. a catalyst bed connected to receive liquid fuel from said chamber and adapted to at least partially convert said liquid fuel to a gas,
 c. a gas tank connected to said bed to receive gas generated in said catalyst bed when contacted by said liquid fuel,
 d. a carburetor,
 e. first duct means for conveying liquid fuel from said chamber to said carburetor and a first pressure-responsive valve for controlling the flow in said first duct means, said first valve being responsive to the pressure in said gas tank to close said first duct means only when the pressure in said gas tank exceeds a predetermined value, and
 f. second duct means connecting said gas tank to said carburetor and additional valve means for control- ling the flow in said second duct means, said additional valve means being connected to open said second duct means when gas is generated in said catalyst bed.

2. Generator as claimed in claim 1 comprising an accelerator-controlled valve between said first valve and said carburetor.

3. Generator as claimed in claim 1 comprising a preheater heated by the gas generated in the catalyst bed and a heater adapted to be heated by the exhaust gas from an engine supplied through said carburetor, means for leading said liquid fuel through said heater and preheater en route to said catalyst bed, and means for mixing said liquid fuel with air just before it enters said catalyst bed.

4. Gas generator as claimed in claim 1 in which said catalyst bed comprises a first part in which said liquid fuel is partially oxidized and a second part in which the output of said first part is steam-reformed.

5. Gas generator as claimed in claim 4 in which said first part contains a platinum catalyst and said second part contains a nickel catalyst and comprising means for introducing $H_2O$ into said second part.

6. A gas generator for mounting on an automobile equipped with an engine, a tank for liquid fuel, and a carburetor through which said fuel is supplied to said engine, said generator comprising:
   a. a first catalyst bed equipped with a spark plug and air supply means,
   b. a second catalyst bed encircling said first catalyst bed,
   c. duct means for connecting both said catalyst beds to receive fuel from said fuel tank and said second catalyst bed to receive water from a source thereof, said beds being adapted to generate a gas when so supplied,
   d. a preheater through which said duct means passes, and means for connecting said preheater to be heated by the gases generated in said catalyst beds,
   e. a main heater through which said duct means pass between said preheater and catalyst beds, and means for connecting said main heater to said engine to be heated by the exhaust gas from said engine,
   f. a gas tank connected to receive said generated gases from said preheater and means for connecting said gas tank to deliver said generated gases to said carburetor,
   g. a float chamber, and means for connecting said float chamber to receive fuel from said fuel tank and to deliver said fuel to said carburetor,
   h. means responsive to the presure in said gas tank for controlling the flow of fuel from said float chamber to said carburetor,
   i. thermostat means responsive to the temperature of said catalyst beds, and connected to regulate the supply of liquid fuel and air to said first catalyst bed in dependence upon said temperature.

7. A process for operating a gas generator in conjunction with an engine consisting of the following steps:
   a. driving said engine by supplying a liquid fuel thereto,
   b. heating a first catalyst bed by a flameless combustion in said catalyst bed of a liquid fuel and air,
   c. heating a second catalyst bed with heat from the first catalyst bed and exhaust gas from the engine,
   d. causing a steam-reforming reaction in said heated second catalyst bed by supplying a mixture of liquid fuel and water thereto,
   e. leading the gas produced in said steam reforming reaction to the engine while maintaining a balance between the heat of the exhaust gas and the heat generated by a particle oxidation reaction in said first catalyst bed on the one hand and the absorption of heat by a steam-reforming reaction in said second catalyst bed on the other hand.

8. A process for operating a gas generator as claimed in claim 7, which comprises preheating the liquid fuel flowing into the first and second catalyst beds with the heat of gas generated in the first and second catalyst beds and then heating said liquid fuel with the exhaust gas of the engine.

9. A process for operating a gas generator as claimed in claim 7, which comprises heating the second catalyst bed with the heat of the first catalyst bed and the exhaust gas of the engine and supplying the mixture of liquid fuel and water to said second catalyst bed when it has reached the reacting temperature.

10. A process for operating a gas generator as claimed in claim 7, which comprises supplying a liquid fuel to said engine to supplement the amount of gas generated in said catalyst beds.

11. A process for operating a gas generator in claim 7, wherein a part of the water supplied into the second catalyst bec is generated by heat exchange from the generated gas and also generated by heat exchange from the exhaust gas of the engine.

* * * * *